United States Patent
Lu et al.

(10) Patent No.: US 10,197,830 B2
(45) Date of Patent: Feb. 5, 2019

(54) DISPLAY DEVICE AND METHOD FOR CONTROLLING GRATING OF THE DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Renwei Guo, Beijing (CN); Chungchun Chen, Beijing (CN); Mubing Li, Beijing (CN); Jinghua Miao, Beijing (CN); Peng Liu, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 122 days.

(21) Appl. No.: 14/910,135

(22) PCT Filed: Sep. 25, 2015

(86) PCT No.: PCT/CN2015/090757
§ 371 (c)(1),
(2) Date: Feb. 4, 2016

(87) PCT Pub. No.: WO2016/141711
PCT Pub. Date: Sep. 15, 2016

(65) Prior Publication Data
US 2017/0038625 A1    Feb. 9, 2017

(30) Foreign Application Priority Data
Mar. 9, 2015   (CN) .......................... 2015 1 0103684

(51) Int. Cl.
G02F 1/133 (2006.01)
G02F 1/29 (2006.01)
(Continued)

(52) U.S. Cl.
CPC ..... *G02F 1/13306* (2013.01); *G02B 27/2214* (2013.01); *G02F 1/137* (2013.01);
(Continued)

(58) Field of Classification Search
CPC combination set(s) only.
See application file for complete search history.

(56) References Cited

U.S. PATENT DOCUMENTS 6,243,063 B1 * 6/2001 Mayhew ................. G02F 1/292
345/87
2010/0182408 A1   7/2010 Liu
(Continued)

FOREIGN PATENT DOCUMENTS

CN    1619358 A    5/2005
CN   102681244 A   9/2012
(Continued)

OTHER PUBLICATIONS

First Office Action regarding Chinese Application No. 201510103684. 2, dated Feb. 13, 2017. Translation provided by Dragon Intellectual Property Law Firm.
(Continued)

*Primary Examiner* — Lauren Nguyen
(74) *Attorney, Agent, or Firm* — Harness, Dickey & Pierce, P.L.C.

(57) ABSTRACT

The present disclosure provides a display device and a method for controlling a grating. The display device includes at least a pixel array and a grating. The pixel array comprises a plurality of columns of pixels. Each pixel includes at least one sub-pixel. Upper edges of odd-num-
(Continued)

bered columns of sub-pixels are aligned and upper edges of even-numbered columns of sub-pixels are aligned, and each of the odd-numbered columns of sub-pixels and each of the even-numbered columns of sub-pixels are staggered longitudinally. The grating comprises a liquid crystal layer and a first substrate. The electrodes of the first substrate are arranged to correspond to a region where a portion of the odd-numbered columns of, or the even-numbered columns of, sub-pixels of the pixel array is located. A corresponding region of the grating is turned on or turned off so as to form a light shielding region and a light transmitting region.

9 Claims, 5 Drawing Sheets

(51) Int. Cl.
*G02F 1/1335* (2006.01)
*G02F 1/1343* (2006.01)
*G02F 1/137* (2006.01)
*G02F 1/1368* (2006.01)
*G02F 7/00* (2006.01)
*G02B 6/02* (2006.01)
*G02B 27/22* (2018.01)

(52) U.S. Cl.
CPC .... *G02F 1/13439* (2013.01); *G02F 1/133512* (2013.01); *G02F 1/134336* (2013.01); *G02F 1/29* (2013.01); *G02F 1/1368* (2013.01); *G02F 2001/134345* (2013.01); *G02F 2201/52* (2013.01)

(56) References Cited

U.S. PATENT DOCUMENTS

| | | | |
|---|---|---|---|
| 2010/0238390 A1* | 9/2010 | Wang | G02F 1/13439 349/139 |
| 2012/0075434 A1 | 3/2012 | Kim et al. | |
| 2012/0293755 A1* | 11/2012 | Nagami | G02F 1/133512 349/106 |

FOREIGN PATENT DOCUMENTS

| | | |
|---|---|---|
| CN | 102914892 A | 2/2013 |
| CN | 103389597 A | 11/2013 |
| CN | 103472650 A | 12/2013 |
| CN | 103984163 A | 8/2014 |
| CN | 104319283 A | 1/2015 |
| CN | 104570370 A | 4/2015 |
| CN | 104599626 A | 5/2015 |
| CN | 104635399 A | 5/2015 |
| TW | 201209448 A | 3/2012 |

OTHER PUBLICATIONS

International Search Report and Written Opinion of the International Searching Authority for International Application No. PCT/CN2015/090757, dated Dec. 15, 2015. Translation provided by Dragon Intellectual Property Law Firm.
Second Office Action regarding Chinese Application No. 201510103684.2, dated Aug. 28, 2017. Translation provided by Dragon Intellectual Property Law Firm.
Gao Hongjin et al., "Novel Display Technology", Aug. 1, 2014, p. 162.
Zeng Xiaoming, "Research on a New Method to Minimize the Crosstalk of Eye-Tracking Auto-Stereoscopic Display by Rearranging RGB Sub-Pixels", Jan. 31, 2014, p. 18.

* cited by examiner

DISPLAY DEVICE AND METHOD FOR CONTROLLING GRATING OF THE DISPLAY DEVICE

CROSS-REFERENCE TO RELATED APPLICATION

This application is the U.S. national phase of PCT Application No. PCT/CN2015/090757 filed on Sep. 25, 2015, which claims a priority of the Chinese Patent Application No. 201510103684.2 filed on Mar. 9, 2015, the disclosures of which are incorporated in their entirety by reference herein.

TECHNICAL FIELD

The present disclosure relates to the field of display technology, in particular to a display device and a method for controlling a grating.

BACKGROUND

The main principle of a three-dimensional (3D) display technology is that a left and a right eyes of a user receive different images respectively, the images received by the left and the right eyes are analyzed by the brain and then overlapped, so as to make the user to perceive a layering of the images, and then a stereoscopic impression may be perceived.

At present, the 3D displayer mainly includes a displayer used together with a 3D glass and a glass-free 3D displayer. A parallax barrier technology is one of the glass-free 3D technologies, where a grating is generally used to form on a display screen non-opaque stripes arranged at intervals. The grating comprises a liquid crystal layer, a first substrate and a second substrate which are arranged respectively on two sides of the liquid crystal layer, and a polarizing film. By controlling a voltage difference between electrodes of the first and the second substrates, liquid crystal molecules in the liquid crystal layer may rotate and then opaque stripes (i.e., a parallax barrier grating) are formed. When the grating is turned on, because of the parallax barrier grating, the images which can be observed by the left eye may only be observed by the left eye but cannot be observed by the right eye; the images which can observed by the right eye may only be observed by the right eye but cannot be observed by the left eye. When the grating is turned off, the parallax barrier grating may not occur on the display panel, so the displayer becomes an ordinary 2D displayer.

The 3D displayer of a conventional parallax barrier technology is arranged in the following way: each column of sub-pixels of a pixel array is formed by red, green and blue sub-pixels and is arranged aligned to each other. Each pixel is formed by the sub-pixels of three colors; therefore a display resolution of a display device is just a physical resolution thereof. As a result, when the display device is of a high Pixels Per Inch (PPI), the sub-pixel needs to be of a smaller size, and an electrode width of the parallax barrier corresponding to the sub-pixels needs also to be very small. Therefore, the electrode width needs to be of a high precision, and a process thereof is difficult. In addition, the electrodes of a grating substrate need to be controlled row by row and one by one, so the control is complex.

SUMMARY

An objective of the present disclosure is to provide a display device and a method for controlling a grating, so as to solve the above problems.

In one aspect, a display device is provided in some embodiment of the present disclosure, including at least a pixel array and a grating; the pixel array includes a plurality of columns of pixels, wherein each pixel includes at least one sub-pixel; each column of sub-pixels includes a same number of sub-pixels, and each sub-pixel is of a same size. Upper edges of odd-numbered columns of sub-pixels are aligned and upper edges of even-numbered columns of sub-pixels are aligned, and each of the odd-numbered columns of sub-pixels and each of the even-numbered columns of sub-pixels are staggered longitudinally by a predetermined length, wherein the predetermined length is smaller than a longitudinal length of the sub-pixel. Colors of adjacent sub-pixels are different. The grating includes a liquid crystal layer and a first substrate and a second substrate which are arranged respectively on two sides of the liquid crystal layer. The first substrate includes a plurality of electrodes arranged longitudinally at intervals and in parallel, and the second substrate includes a plurality of electrodes arranged transversely at intervals and in parallel. The electrodes of the first substrate and the second substrate are configured to generate an electric field to control rotation of each liquid crystal molecule in the liquid crystal layer. A width of the electrode of the first substrate is smaller than a transverse length of the sub-pixel. An interval between adjacent electrodes of the first substrate is identical to a transverse width of a black matrix between adjacent sub-pixels. The electrodes of the first substrate are arranged to correspond to a region where a portion of the odd-numbered columns of sub-pixels of the pixel array is located or a region where a portion of the even-numbered columns of sub-pixels of the pixel array is located, and a corresponding region of the grating is turned on or turned off according to a level signal, so as to form a light shielding region and a light transmitting region of the grating.

Optionally, each column of sub-pixels includes groups of sub-pixels arranged consecutively. Each group of sub-pixels includes at least three colors of sub-pixels arranged in turn, and the colors of adjacent sub-pixels are different.

Optionally, each pixel displays colors by a support of the sub-pixels in adjacent columns.

Optionally, a width of the electrode of the second substrate is identical to the longitudinal length of the sub-pixel, and an interval between adjacent electrodes of the second substrate is identical to a longitudinal width of the black matrix between adjacent sub-pixels.

Optionally, high-level signal electrode groups each including at least one electrode and low-level signal electrode groups each including at least one electrode which are arranged at intervals are formed, when the grating is turned on and a high-level signal and a low-level signal are provided alternately to the electrodes of the first substrate. Each of the high-level signal electrode groups and the low-level signal electrode groups includes two electrodes. And the high-level signal electrode groups and the low-level signal electrode groups are formed by one manufacturing process.

Optionally, the width of the electrode of the first substrate is 10-90% of the transverse length of the sub-pixel.

Optionally, the electrodes of the second substrate are formed as a plane electrode.

Optionally, each pixel of the pixel array comprises 1.5 sub-pixels or 2 sub-pixels.

Optionally, a ratio between the transverse length of the sub-pixel and the longitudinal length thereof is within a range from 1:1 to 2:1.

Optionally, each column of the sub-pixels includes groups of sub-pixels arranged consecutively, wherein each group of sub-pixels includes a red sub-pixel, a green sub-pixel and a blue sub-pixel arranged in turn. The predetermined length by which each of the odd-numbered columns of sub-pixels and each of the even-numbered columns of sub-pixels are staggered longitudinally is a half of the longitudinal length of the sub-pixel.

In another aspect, the present disclosure further provides in some embodiment a method for controlling the grating of the display device. The method includes a step of turning on the grating and a step of turning off the grating. The step of turning on the grating includes: providing a high-level signal to the electrodes of the second substrate and providing a high-level signal and a low-level signal alternately to the electrodes of the first substrate, so as to form high-level signal electrode groups each includes at least one electrode and low-level signal electrode groups each includes at least one electrode which are arranged at intervals; or providing a low-level signal to the electrodes of the second substrate and providing a high-level signal and a low-level signal alternately to the electrodes of the first substrate, so as to form high-level signal electrode groups each includes at least one electrode and low-level signal electrode groups each includes at least one electrode which are arranged at intervals. And the step of turning off the grating includes: providing simultaneously a high-level signal or a low-level signal to the electrodes of both the first substrate and the second substrate.

According to the display device provided by the present disclosure, the grating is arranged to correspond to the arrangement of the pixels, so that the width of each electrode of the grating substrate is increased. As a result, the manufacturing process precision of the electrodes is reduced, the manufacturing thereof is simplified, and the cost thereof is reduced. The display device may be switched between a 2D display and a 3D display by turning on and turning off the grating. In addition, an amount of electrode control lines is reduced, thereby simplifying a structure of the grating.

DETAILED DESCRIPTION

In order to make those skilled in the art to understand the technical solutions of the present disclosure better, the present disclosure will be described in details in conjunction with drawings and embodiments. Obviously, the following embodiments merely relate to a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

As shown in FIG. 1-6, the present disclosure provides in an embodiment a display device, including a pixel array and a grating.

Figure 1:
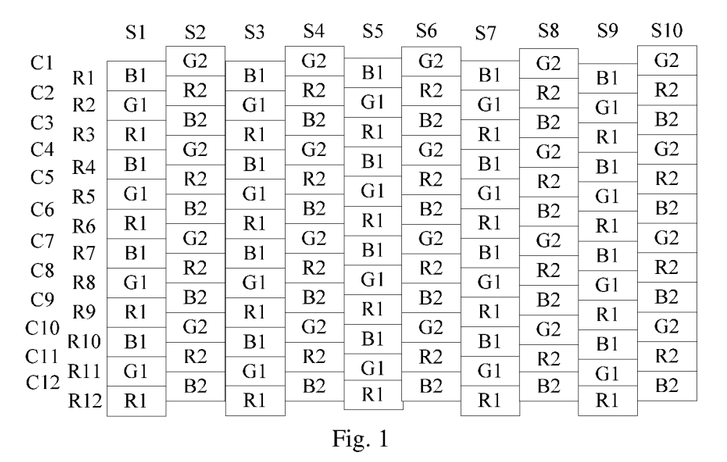
FIG. 1 is a schematic view showing a pixel array according to an embodiment of the present disclosure.

The pixel array includes a plurality of columns of pixels. Each pixel includes at least one sub-pixel. Each column of sub-pixels includes groups of sub-pixels arranged consecutively, wherein each group of sub-pixels includes at least three colors of sub-pixels arranged in turn. Each column of sub-pixels includes a same number of sub-pixels, and each sub-pixel is of a same size. Upper edges of odd-numbered columns of sub-pixels are aligned and upper edges of even-numbered columns of sub-pixels are aligned, and each of the odd-numbered columns of sub-pixels and each of the even-numbered columns of sub-pixels are staggered longitudinally by a predetermined length. The predetermined length is smaller than a longitudinal length of the sub-pixel. The colors of adjacent sub-pixels are different.

Figure 3:
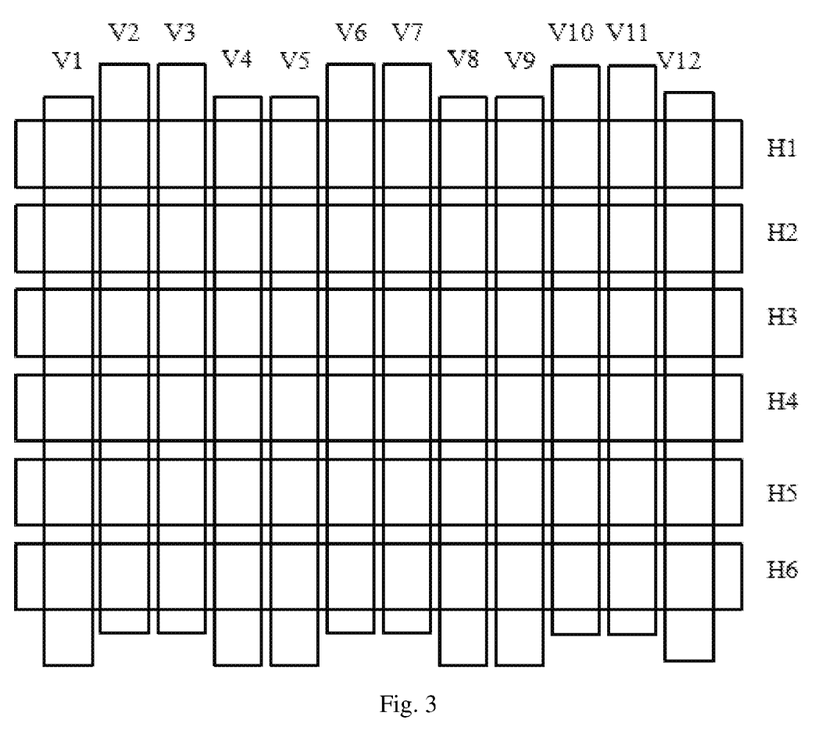
FIG. 3 is a schematic view showing a grating according to an embodiment of the present disclosure.

The grating includes a liquid crystal layer and a first substrate and a second substrate which are arranged respectively on two sides of the liquid crystal layer. The first substrate includes a plurality of electrodes arranged longitudinally at intervals and in parallel, and the second substrate comprises a plurality of electrodes arranged transversely at intervals and in parallel. The electrodes of the first substrate and the second substrate are configured to generate an electric field to control rotation of each liquid crystal molecule in the liquid crystal layer.

A width of the electrode of the first substrate is smaller than a transverse length of the sub-pixel, and an interval between adjacent electrodes of the first substrate is identical to a transverse width of a black matrix between adjacent sub-pixels.

A width of the electrode of the second substrate is identical to the longitudinal length of the sub-pixel, and an interval between adjacent electrodes of the second substrate is identical to a longitudinal width of the black matrix between adjacent sub-pixels.

The 3D display may be implemented by turning on the grating. To be specific, the step of turning on the grating includes:

providing a high-level signal to the electrodes of the second substrate and providing a high-level signal and a low-level signal alternately to the electrodes of the first substrate, so as to form high-level signal electrode groups each including at least one electrode and low-level signal electrode groups each including at least one electrode which are arranged at intervals; or providing a low-level signal to the electrodes of the second substrate and providing a high-level signal and a low-level signal alternately to the electrodes of the first substrate, so as to form high-level signal electrode groups each including at least one electrode and low-level signal electrode groups each including at least one electrode which are arranged at intervals.

According to the display device provided by the present disclosure, the grating is arranged to correspond to the arrangement of the pixels, so that the width of each electrode of the grating substrate is increased, thereby the manufacturing process precision of the electrodes is reduced, the manufacturing thereof is simplified, and the cost thereof is reduced.

To be specific, an amount of the pixel columns included in the pixel array is not limited by the embodiment of the present disclosure. In a practical implementation, the amount of the pixel columns may be determined according to a size of a screen, a physical resolution of the display device and a size of each sub-pixel. For example, the pixel array may include 10 or 12 columns of pixels. An amount of the pixels in each column of pixels is not limited. For example, each column of pixels may include 11 or 13 pixels.

No matter how many pixels are included in each column of pixels, each pixel may include at least one sub-pixel. For example, each pixel may include 1, 1.5 or 2 sub-pixels. Furthermore, the pixel array includes a plurality of columns of pixels and each pixel includes at least one sub-pixel, so the pixel array includes a plurality of columns of sub-pixels. In addition, each sub-pixel being of a same size refers to that each sub-pixel is of a same transverse length and a same longitudinal length.

Each sub-pixel of the pixel array may emit a light of a required color independently. The sub-pixels are generally controlled by a thin film transistor (TFT) array, and each sub-pixel corresponds to at least one thin film transistor. The thin film transistors are arranged as an array, which are controlled by gate lines and data lines.

In a practical application, the display device may be an organic light-emitting diode (OLED) device. Each sub-pixel may include one OLED, and emit light of a required color by a corresponding OLED directly. For example, a red sub-pixel may emit red light by the corresponding OLED.

In addition, the display device may be a liquid crystal display device, wherein each sub-pixel includes a light filter unit. Light which passes through the light filter unit of each sub-pixel may be of a color corresponding to the color of sub-pixel. To be specific, different colors of color filter films are arranged corresponding to the position of each sub-pixel, and the light which passes through the color filter films may be of the corresponding color. The color of the color filter film corresponding to the sub-pixel may be the same as the color of the sub-pixel. For example, a color filter film arranged corresponding to a red sub-pixel is red.

In the embodiment of the present disclosure, the pixel array may include three colors of sub-pixels, e.g., a red sub-pixel R, a blue sub-pixel B and green sub-pixel G. Of course, the pixel array may include four colors of sub-pixels, e.g., a red sub-pixel R, a blue sub-pixel B, a green sub-pixel G and a sub-pixel W of a complementary color. Both the color types of the sub-pixels and the color type of the complementary color W are not limited herein.

When arranging each column of sub-pixels in the pixel array provided by the embodiment of the present disclosure, different colors of sub-pixels may be arranged circularly. To be specific, each column of sub-pixels may include groups of sub-pixels arranged consecutively, and each group of sub-pixels may include at least three colors of sub-pixels arranged in turn. For example, when the pixel array includes red sub-pixels R, blue sub-pixels B and green sub-pixels G, each column of sub-pixels may include groups of sub-pixels arranged consecutively, wherein each group of sub-pixels may include a red sub-pixel R, a blue sub-pixel B and a green sub-pixel G which are arranged in turn.

In order to make the pixel array put in an order, each column of sub-pixels may include a same number of sub-pixels. For example, each column of sub-pixels may include 12 or 15 sub-pixels. In addition, in the embodiment of the present disclosure, each column of sub-pixels includes a same number of sub-pixels, whereby it may be guaranteed that each pixel may be supported by the adjacent sub-pixels thereof, such that there may not be any sub-pixel which cannot display normally due to that it cannot be supported by the adjacent sub-pixels of the other colors.

Upper edges of odd-numbered columns of sub-pixels being aligned refers to that all the odd-numbered columns of sub-pixels which are arranged in a same row are aligned along the oriental direction. Upper edges of even-numbered columns of sub-pixels being aligned refers to that all the even-numbered columns of sub-pixels which are arranged in a same row are aligned along the oriental direction. For example, the sub-pixel in a first row and a first column is aligned with the sub-pixel in a first row and a third column along the oriental direction.

The predetermined length by which each of the odd-numbered columns of sub-pixels and each of the even-numbered columns of sub-pixels are staggered longitudinally may be a half or one third of the longitudinal length of the sub-pixel, as long as the predetermined length is smaller than a longitudinal length of the sub-pixel. For example, an even-numbered column of sub-pixels may be staggered longitudinally with an odd-numbered column of sub-pixels by a half of the longitudinal length of the sub-pixel.

In addition, a color of a sub-pixel is different from the colors of its adjacent sub-pixels. To be specific, the color of the sub-pixel is different from the colors of the sub-pixels on its left, right, upper and lower sides. In order to guarantee that the colors of adjacent sub-pixels are different, the arrangements of the sub-pixels in both the odd-numbered and the even-numbered columns of sub-pixels are different. To be specific, when each column of sub-pixels includes groups of sub-pixels arranged consecutively, wherein each group of sub-pixels includes a red sub-pixel R, a blue sub-pixel B and a green sub-pixel G which are arranged in turn, the sub-pixels in the odd-numbered and the even-numbered columns of sub-pixels may be arranged as follows.

A first arrangement: an arrangement of the odd-numbered columns of sub-pixels may be B-G-R-B . . . , and an arrangement of the even-numbered columns of sub-pixels may be G-R-B-G . . . .

A second arrangement: an arrangement of the odd-numbered columns of sub-pixels may be B-R-G-B . . . , and an arrangement of the even-numbered columns of sub-pixels may be R-G-B-R . . . .

A third arrangement: an arrangement of the odd-numbered columns of sub-pixels may be G-B-R-G . . . , and an arrangement of the even-numbered columns of sub-pixels may be B-R-G-B . . . .

A fourth arrangement: an arrangement of the odd-numbered columns of sub-pixels may be G-R-B-G . . . , and an arrangement of the even-numbered columns of sub-pixels may be R-B-G-R . . . .

A fifth arrangement: an arrangement of the odd-numbered columns of sub-pixels may be R-B-G-R . . . , and an arrangement of the even-numbered columns of sub-pixels may be B-G-R-B . . . .

A sixth arrangement: an arrangement of the odd-numbered columns of sub-pixels may be R-G-B-R . . . , and an arrangement of the even-numbered columns of sub-pixels may be G-B-R-G . . . .

In order to realize a 3D effect on the displayed image, the light shielding region of the grating shields a portion of the pixel array region, thereby dividing the displayed image into a plurality of views, and different views are guided to different eyes of the user, so as to realize a 3D effect. For example, the displayed image may be divided into a left view and a right view by the light shielding region and the light transmitting region of the grating. The left view is guided to the left eye of the user, and right view is guided to the right eye of the user, thereby realizing a 3D effect.

Furthermore, the left and the right views hereinabove may be divided into four views (by adding two views along directions of diagonals).

According to the display device provided by the embodiment of the present disclosure, each column of sub-pixels includes groups of sub-pixels arranged consecutively, wherein each group of sub-pixels includes at least three colors of sub-pixels arranged in turn, each of the odd-numbered columns of sub-pixels and each of the even-numbered columns of sub-pixels are staggered longitudinally by a predetermined length, and the colors of adjacent sub-pixels are different. Therefore, a sub-pixel and its adjacent two sub-pixels in a same column may form a delta, thereby the sub-pixel may be supported by the adjacent sub-pixels and support the adjacent sub-pixels to form three primary colors so as to display different colors. As a result, a display resolution is larger than a physical resolution, thereby improving the PPI of the display device and then improving the 3D display effect.

Based the description of the embodiment hereinabove, a pixel array provided by an embodiment of the present disclosure is shown in FIG. 1. The pixel array shown in FIG. 1 includes ten columns of sub-pixels. Each pixel includes two sub-pixels. each column of sub-pixels includes groups of sub-pixels arranged consecutively, wherein each group of sub-pixels includes a red sub-pixel, a blue sub-pixel and a green sub-pixel which are arranged in turn. The odd-numbered columns of sub-pixels refer to the first, the third, the fifth, the seventh and the ninth column of sub-pixels, and the even-numbered columns of sub-pixels refer to the second, the fourth, the sixth, the eighth, the tenth column of sub-pixels. Upper edges of the odd-numbered columns of sub-pixels are aligned and upper edges of the even-numbered columns of sub-pixels are aligned, and the predetermined length by which each of the odd-numbered columns of sub-pixels and each of the even-numbered columns of sub-pixels are staggered longitudinally is a half of the longitudinal length of the sub-pixel. The colors of adjacent sub-pixels in the pixel array are different.

As shown in FIG. 1, the arrangement of the odd-numbered columns of sub-pixels is B-G-R-B . . . , and the arrangement of the even-numbered columns of sub-pixels is G-R-B-G . . . . In addition, taking the green sub-pixel at S2C4 shown in FIG. 1 as an example, none of the adjacent sub-pixels surrounding the green sub-pixel is green. Each sub-pixel and its adjacent two sub-pixels which are of different colors and in a same column form an inclined triangle (delta) structure. Taking the blue sub-pixel at S1R1 shown in FIG. 1 as an example, the blue sub-pixel, the green sub-pixel at S2C1, and the red sub-pixel at S2C2 form a delta structure.

It should be noted that, in FIG. 1 and the other figures, "S" prior to each number represents the columns where the sub-pixels are located, "R" prior to each number represents rows where the odd-numbered columns of sub-pixels are located, and "C" prior to each number represents rows where the even-numbered columns of sub-pixels are located. Letters on the sub-pixels represent colors thereof. For example, "R" represents that the sub-pixel is red, "G" represents that the sub-pixel is green, and "B" represents that the sub-pixel is blue. For example, the sub-pixel (G2) at S2C1 is green. The numbers "1" on the sub-pixels represent that the sub-pixels are located in the odd-numbered columns of sub-pixels, and the number "2" on the sub-pixels represent that the sub-pixels are located in the even-numbered columns of sub-pixels.

In some embodiment of the present disclosure, the light shielding region and the light transmitting region of the grating may be grid-like or bar-like. When the light shielding region and the light transmitting region of the grating are of different shapes, the light may be controlled to transmit in different directions. Therefore the views may be divided by the grating. Optionally, the light shielding region and the light transmitting region of the grating are bar-liked regions arranged vertically. When a portion of the pixel array is shielded by the grating of the structure hereinabove, the display device may divide the display image into a left view and a right view and guide the left view and the right view to the left and the right eye of the user respectively, thereby realizing a 3D display with two views. A process of the 3D display with two views is simple and easy to realize.

It should be noted that, the grating provided by the embodiment of the present disclosure may distribute the images displayed by the odd-numbered columns of sub-pixels of the pixel array to the left view and distribute the images displayed by the even-numbered columns of sub-pixels of the pixel array to the right view. In addition, the light shielding region of the grating may shield the odd-numbered columns of sub-pixels of the pixel array, and the light shielding region of the grating may project light emitted by the odd-numbered columns of sub-pixels of the pixel array to the left side to form the left view and project light emitted by the even-numbered columns of sub-pixels of the pixel array to the right side to form the left view, with a certain angle. The light shielding region of the grating may shield the even-numbered columns of sub-pixels of the pixel array, and the light shielding region of the grating may project light emitted by the odd-numbered columns of sub-pixels of the pixel array to the left side to form the left view and project light emitted by the even-numbered columns of sub-pixels of the pixel array to the right side to form the left view, with another angle. Of course, the light shielding region of the grating may shield a portion of the odd-numbered columns of sub-pixels of the pixel array and a portion of the even-numbered columns of sub-pixels of the pixel array, and divide the image into a left view and a right view with a corresponding angle. The position of the pixel array which is shielded by the light shielding region of the grating is not limited herein.

Figure 2:
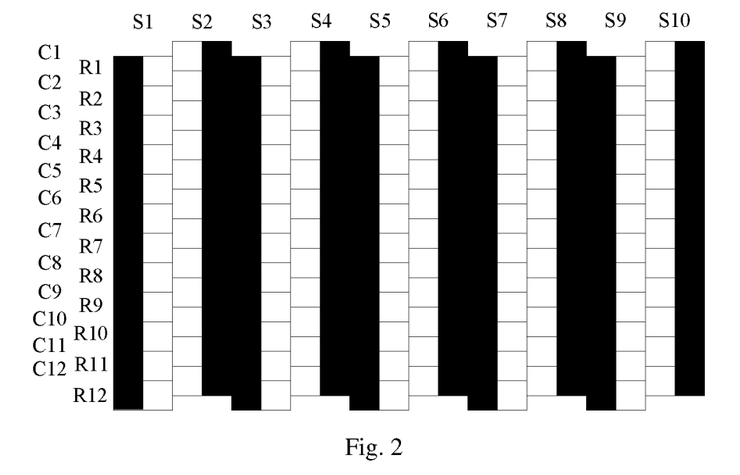
FIG. 2 is a schematic view showing how the grating shields the pixel array when the grating is turned on according to an embodiment of the present disclosure.

In some embodiment, in order to reduce interference between the views reaching the left and right eyes of the user and make the 3D image uniform, the above mentioned portion of the pixel array may be a half of the pixel array. To be specific, the light shielding region of the grating may shield a left half portion of the odd-numbered columns of sub-pixels of the pixel array and a right half portion of the even-numbered columns of sub-pixels of the pixel array, and then the light transmitting region of the grating corresponds to a right half portion of the odd-numbered columns of sub-pixels of the pixel array and a left half portion of the even-numbered columns of sub-pixels of the pixel array. In addition, the light shielding region of the grating may shield the right half portion of the odd-numbered columns of sub-pixels of the pixel array and the left half portion of the even-numbered columns of sub-pixels of the pixel array, and then the light transmitting region of the grating corresponds to the left half portion of the odd-numbered columns of sub-pixels of the pixel array and the right half portion of the even-numbered columns of sub-pixels of the pixel array. Referring to FIG. 2 which shows a relation between the pixel array and the light shielding region of the grating, the light shielding region of the grating shields the left half portion of the odd-numbered columns of sub-pixels of the pixel array and the right half portion of the even-numbered columns of sub-pixels of the pixel array.

In some embodiment, a ratio between the transverse length of each sub-pixel and the longitudinal length thereof may be defined when setting a size of each sub-pixel in the pixel array. Optionally, the ratio between the transverse length of each sub-pixel and the longitudinal length thereof may be within a range from 1:1 to 2:1 (e.g., 1:1, 1.5:1 or 2:1).

Referring to FIG. 1, the transverse direction in the embodiment of the present disclosure refers to a left-right direction in FIG. 1, and the longitudinal direction refers to an up-down direction in FIG. 1. For example, when the ratio between the transverse length of each sub-pixel and the longitudinal length thereof is 3:2 and if the transverse length of each sub-pixel is 3 centimeter, then the longitudinal length thereof may be 2 centimeter.

In another embodiment, the ratio between the transverse length of each sub-pixel and the longitudinal length thereof is 2:1. For example, when the transverse length of each sub-pixel is 2 centimeter, then the longitudinal length thereof may be 1 centimeter. In the pixel array shown in FIG. 1, the ratio between the transverse length of each sub-pixel and the longitudinal length thereof is 2:1.

No matter whether the ratio between the transverse length of each sub-pixel and the longitudinal length thereof is set within a range from 1:1 to 2:1 or set as 2:1 directly, each sub-pixel may have a large transverse length, thereby facilitating the processing and manufacturing thereof.

When manufacturing the electrode of the first substrate corresponding to the transverse width of each sub-pixel, the width of the electrode may be increased, thereby facilitating the manufacturing and reducing the cost.

The optional solutions hereinabove may be combined in any way to form the embodiment of the present disclosure, and the description thereof is omitted herein.

A grating structure is provided corresponding to the pixel array hereinabove. The following description is based on a landscape-screen grating structure. It should be noted that the description is also applicable to a portrait-screen grating structure.

To be specific, the grating includes a liquid crystal layer and a first substrate and a second substrate which are arranged respectively on two sides of the liquid crystal layer.

The first substrate includes a plurality of electrodes arranged longitudinally at intervals and in parallel. The second substrate includes a plurality of electrodes arranged transversely at intervals and in parallel. The electrodes of the first substrate and the second substrate are configured to generate an electric field to control rotation of each liquid crystal molecule in the liquid crystal layer.

Parts of electrodes (V1-V12) of the first substrate (not shown) of the grating are schematically shown in FIG. 3, and parts of electrodes (H1-H6) of the second substrate (not shown) of the grating are also schematically shown therein, and the liquid crystal layer between the first and the second substrates is not shown.

A width of the electrode of the first substrate is smaller than the transverse length of the sub-pixel. An interval between adjacent electrodes of the first substrate is identical to a transverse width of a black matrix between adjacent sub-pixels.

A width of the electrode of the second substrate is identical to the longitudinal length of the sub-pixel. An interval between adjacent electrodes of the second substrate is identical to a longitudinal width of the black matrix between adjacent sub-pixels.

By the arrangement of sub-pixels hereinabove, it may be guaranteed that each sub-pixel may have a large transverse length, so that the width of the electrode may be increased when manufacturing the electrode of the first substrate corresponding to the transverse width of each sub-pixel, thereby facilitating the manufacturing and reducing the cost.

The 3D display can be realized by turning on grating. The step of turning on the grating includes:

providing a high-level signal to the electrodes of the second substrate and providing a high-level signal and a low-level signal alternately to the electrodes of the first substrate, so as to form high-level signal electrode groups each including at least one electrode and low-level signal electrode groups each including at least one electrode which are arranged at intervals; or providing a low-level signal to the electrodes of the second substrate and providing a high-level signal and a low-level signal alternately to the electrodes of the first substrate, so as to form high-level signal electrode groups each including at least one electrode and low-level signal electrode groups each including at least one electrode which are arranged at intervals.

To be specific, when a high-level signal and a low-level signal are alternately provided to every other two electrodes of the first substrate, and then high-level signal electrode groups each including two electrodes and low-level signal electrode groups each including two electrodes which are arranged at intervals are formed, optional control methods are described in the following.

Figure 4:
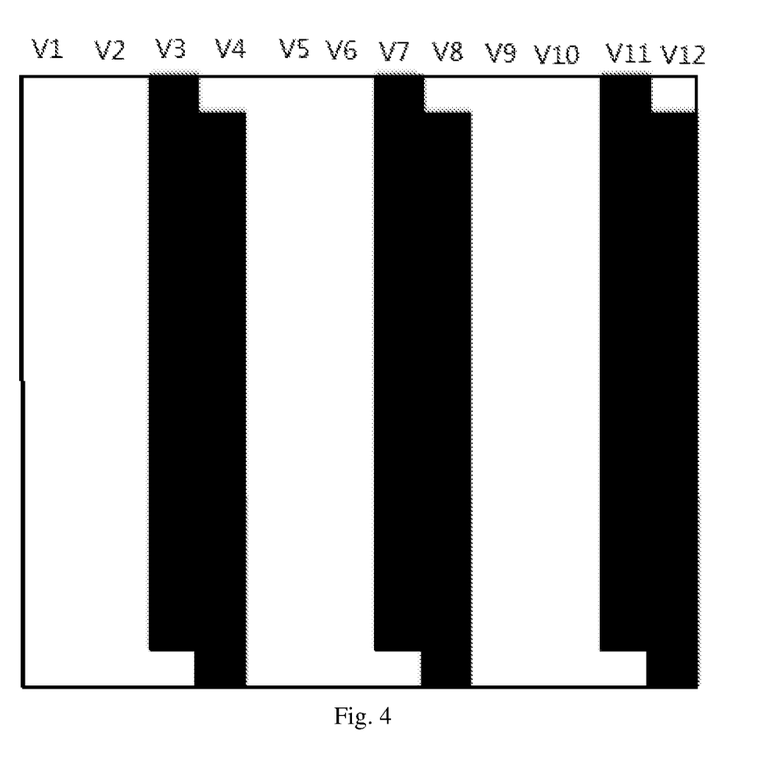
FIG. 4 is a schematic view showing a light shielding region and a light transmitting region of the grating when the grating is turned on according to an embodiment of the present disclosure.

A first control method: when V1, V2, V5, V6, V9 and V10 are at a low level and H1-H6 are at a low level, there is no voltage difference between the upper and the lower electrodes, and then the liquid crystal molecules may not rotate and light may be transmitted normally; when V3, V4, V7, V8, V11 and V12 are at a high level and H1-H6 are at a low level, there is a voltage difference between the upper and the lower electrodes, and then the liquid crystal molecules may rotate 90 degrees and the light may be shielded. A display effect of the grating is shown in FIG. 4, and a light shielding region and a light transmitting region similar to that shown in FIG. 2 are formed on the pixel array. V1 may correspond to the right half portion of the S1 column of sub-pixels, and the other electrodes may be arranged in turn.

A second control method: when V1, V2, V5, V6, V9 and V10 are at a high level and H1-H6 are at a high level, there is no voltage difference between the upper and the lower electrodes, and then the liquid crystal molecules may not rotate and light may be transmitted normally; when V3, V4, V7, V8, V11 and V12 are at a low level and H1-H6 are at a high level, there is a voltage difference between the upper and the lower electrodes, and then the liquid crystal molecules may rotate 90 degrees and the light may be shielded. A display effect of the grating is shown in FIG. 4, and a light shielding region and a light transmitting region similar to that shown in FIG. 2 are formed on the pixel array. V1 may correspond to the right half portion of the S1 column of sub-pixels, and the other electrodes may be arranged in turn.

The method for turning on the grating may be characterized in that:

A: the high-level signal electrode groups each including at least one electrode and the low-level signal electrode groups each including at least one electrode which are arranged at intervals are formed on the first substrate;

B: all the electrodes of the second substrate are provided with a signal of the same level (i.e., a same low-level signal or a same high-level signal).

Figure 5:
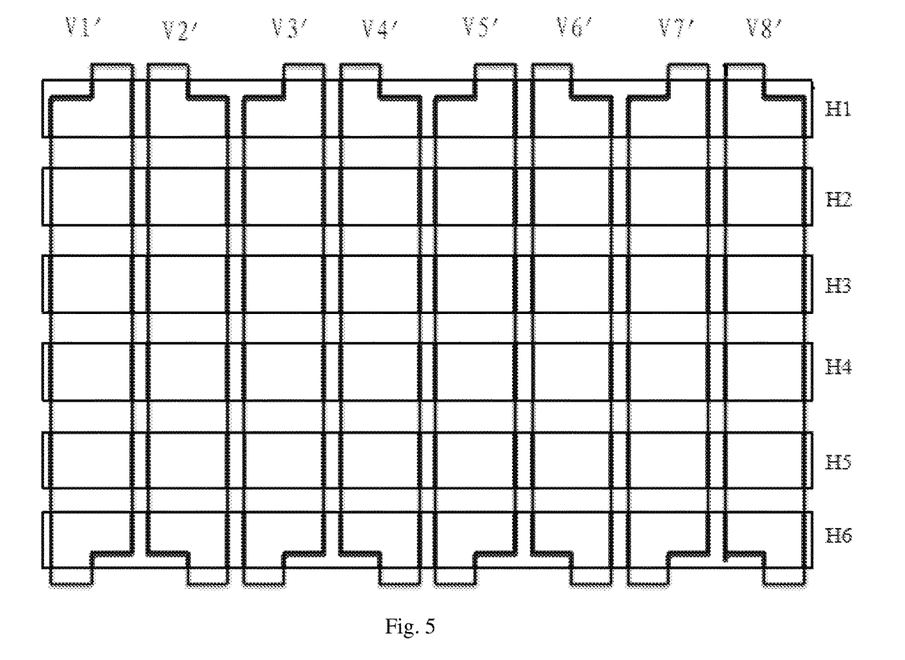
FIG. 5 is a schematic view showing a grating where adjacent electrodes are combined according to an embodiment of the present disclosure.

In terms of A, the grating structure may be further optimized. To be specific, the high-level signal electrode group and the low-level signal electrode group each includes two electrodes, so they may be formed by one manufacturing process. Therefore, sizes of both the high-level signal electrode group and the low-level signal electrode group may be larger, thereby reducing a manufacturing precision and reducing a manufacturing cost. In addition, the amount of the control lines may be reduced and the control may be less difficult. As shown in FIG. 5, two adjacent electrodes are formed by one manufacturing process, so as to form electrodes V1', V2', V3', V4', V5', V6', V7' and V8'.

It should be understood that, the amounts of the electrodes of the high-level signal electrode group and the low-level signal electrode group may be the same or different, and the amount of the electrodes of each electrode group may be more than 2, which may be adjusted according to requirements of an actual brightness and interference parameters and not limited herein.

The width of the electrodes of the first substrate may be adjusted according to the requirements of the brightness and the interference parameters of an actual product. For example, the width of the electrode of the first substrate may be 10-90% of the transverse length of the sub-pixel. Optionally, as described in the embodiment hereinabove, the width of the electrode of the first substrate is 50% of the transverse length of the sub-pixel.

Figure 6:
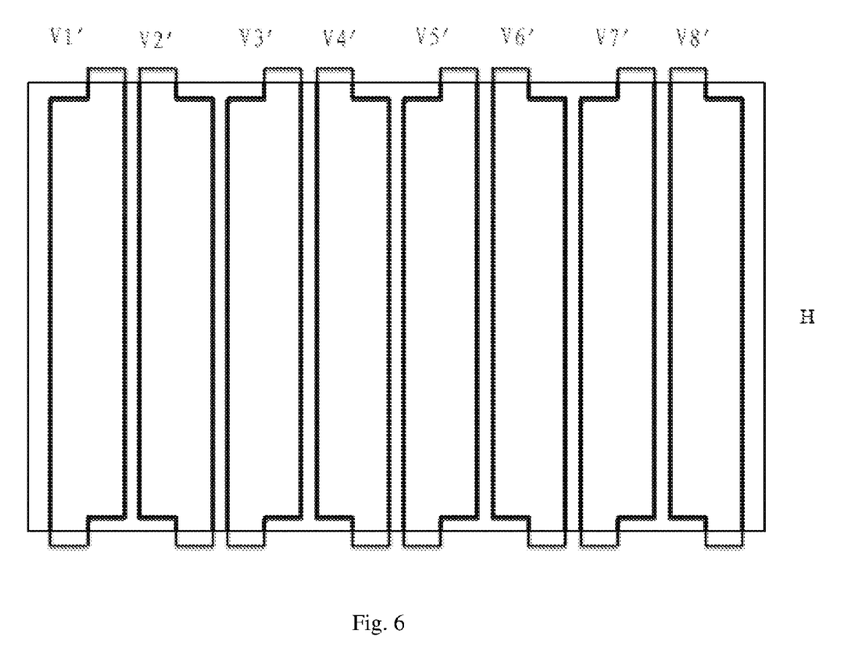
FIG. 6 is a schematic view showing a grating where the electrodes of the second substrate are formed as a plane electrode according to an embodiment of the present disclosure.

In terms of B, the grating structure may be further optimized as follows. The electrodes of the second substrate may be formed as a plane electrode, thereby reducing the cost. In addition, only one control data line is needed, thereby the amount of the control lines and the difficulty of control may be reduced. As shown in FIG. 6, the electrodes of the second substrate are formed as a plane electrode H.

A method for controlling the grating of the display device hereinabove is provided, including the steps of turning on and turning off the grating.

The step of turning on the grating includes:

providing a high-level signal to the electrodes of the second substrate and providing a high-level signal and a low-level signal alternately to the electrodes of the first substrate, so as to form high-level signal electrode groups each including at least one electrode and low-level signal electrode groups each including at least one electrode which are arranged at intervals; or providing a low-level signal to the electrodes of the second substrate and providing a high-level signal and a low-level signal alternately to the electrodes of the first substrate, so as to form high-level signal electrode groups each including at least one electrode and low-level signal electrode groups each including at least one electrode which are arranged at intervals.

When the grating turned on, the light shielding regions and the light transmitting regions which are arranged at intervals may be formed on the pixel array, and a pixel display region is divided into a left view and a right view (or more views) for the left and the right eyes respectively so as to realize a 3D display. In addition, the amount of the electrode control lines is reduced, and the grating structure may be simplified.

The step of turning off the grating includes providing simultaneously a high-level signal or a low-level signal to the electrodes of both the first substrate and the second substrate.

When the grating is turned off, a 2D image is displayed on the pixel array. Therefore, the display device may be switched between a 2D display and a 3D display by turning on and turning off the grating.

It should be understood that, the above are merely the embodiments for illustrating the principle of the present disclosure, but the present disclosure is not limited herein. A person skilled in the art may make further modifications and improvements without departing from the principle and spirit of the present disclosure, and these modifications and improvements shall also fall within the scope of the present disclosure.

What is claimed is:

1. A display device, comprising at least a pixel array and a grating, wherein:

the pixel array comprises a plurality of columns of pixels and each pixel comprises at least one sub-pixel;

each column of sub-pixels comprises a same number of sub-pixels and each sub-pixel is of a same size;

upper edges of odd-numbered columns of sub-pixels are aligned and upper edges of even-numbered columns of sub-pixels are aligned;

each of the odd-numbered columns of sub-pixels and each of the even-numbered columns of sub-pixels are staggered longitudinally by a predetermined length;

the predetermined length is smaller than a longitudinal length of the sub-pixel;

the grating comprises a liquid crystal layer and a first substrate and a second substrate which are arranged respectively on two sides of the liquid crystal layer;

the first substrate comprises a plurality of electrodes arranged longitudinally at intervals and in parallel;

the second substrate comprises a plurality of electrodes arranged transversely at intervals and in parallel;

the electrodes of the first substrate and the second substrate are configured to generate an electric field to control rotation of each liquid crystal molecule in the liquid crystal layer;

a width of the electrode of the first substrate is smaller than a transverse length of the sub-pixel;

an interval between adjacent electrodes of the first substrate is identical to a transverse width of a black matrix between adjacent sub-pixels;

the electrodes of the first substrate are arranged to correspond to a region where a portion of the odd-numbered columns of sub-pixels of the pixel array is located or a region where a portion of the even-numbered columns of sub-pixels of the pixel array is located;

a corresponding region of the grating is turned on or turned off according to a level signal, so as to form a light shielding region and a light transmitting region of the grating;

a width of the electrode of the second substrate is identical to the longitudinal length of the sub-pixel; and an interval between adjacent electrodes of the second substrate is identical to a longitudinal width of the black matrix between adjacent sub pixels.

2. The display device according to claim 1, wherein:

each column of sub-pixels comprises groups of sub-pixels arranged consecutively;

each group of sub-pixels comprises at least three colors of sub-pixels arranged in turn; and colors of adjacent sub-pixels are different.

3. The display device according to claim 1, wherein each pixel displays colors by a support of the sub-pixels in adjacent columns.

4. The display device according to claim 1, wherein:

high-level signal electrode groups each comprising at least one electrode and low-level signal electrode groups each comprising at least one electrode which are arranged at intervals are formed, when the grating is turned on and a high-level signal and a low-level signal are provided alternately to the electrodes of the first substrate;

each of the high-level signal electrode groups and the low-level signal electrode groups comprises two electrodes; and the high-level signal electrode groups and the low-level signal electrode groups are formed by one manufacturing process.

5. The display device according to claim 1, wherein the width of the electrode of the first substrate is 10-90% of the transverse length of the sub-pixel.

6. The display device according to claim 1, wherein the electrodes of the second substrate are formed as a plane electrode.

7. The display device according to claim 1, wherein each pixel of the pixel array comprises 1.5 sub-pixels or 2 sub-pixels.

8. The display device according to claim 1, wherein a ratio between the transverse length of the sub-pixel and the longitudinal length thereof is within a range from 1:1 to 2:1.

9. The display device according to claim 1, wherein:

each column of the sub-pixels comprises groups of sub-pixels arranged consecutively;

each group of sub-pixels comprises a red sub-pixel, a green sub-pixel, and a blue sub-pixel arranged in turn; and the predetermined length by which each of the odd-numbered columns of sub-pixels and each of the even-numbered columns of sub-pixels are staggered longitudinally is a half of the longitudinal length of the sub-pixel.

* * * * *